May 15, 1923.
A. J. ARNOLDSON
1,455,517
RESILIENT WHEEL
Filed May 12, 1922
2 Sheets-Sheet 1
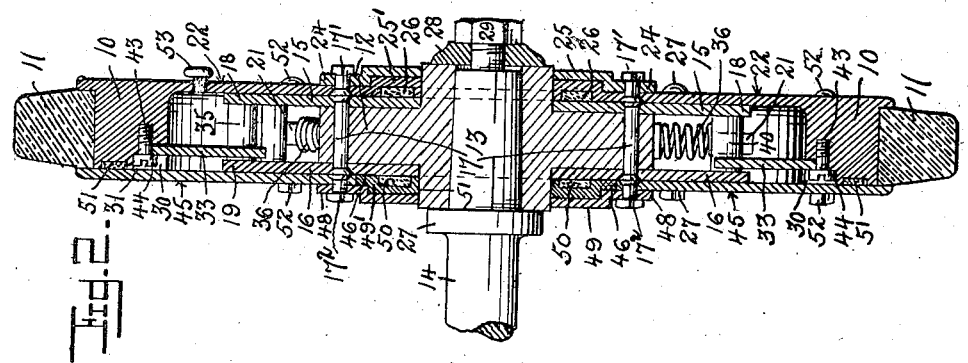
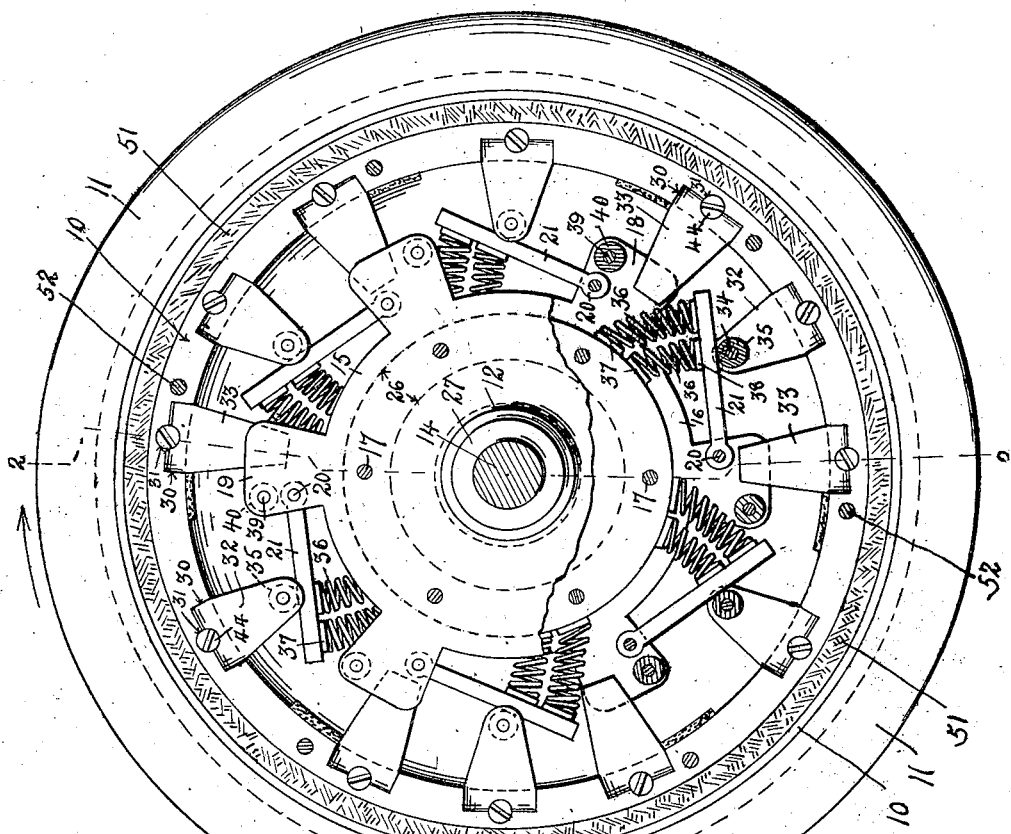
INVENTOR.
BY A. J. ARNOLDSON,
ATTORNEY.

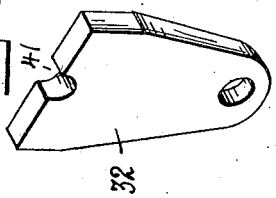
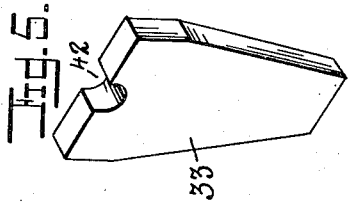
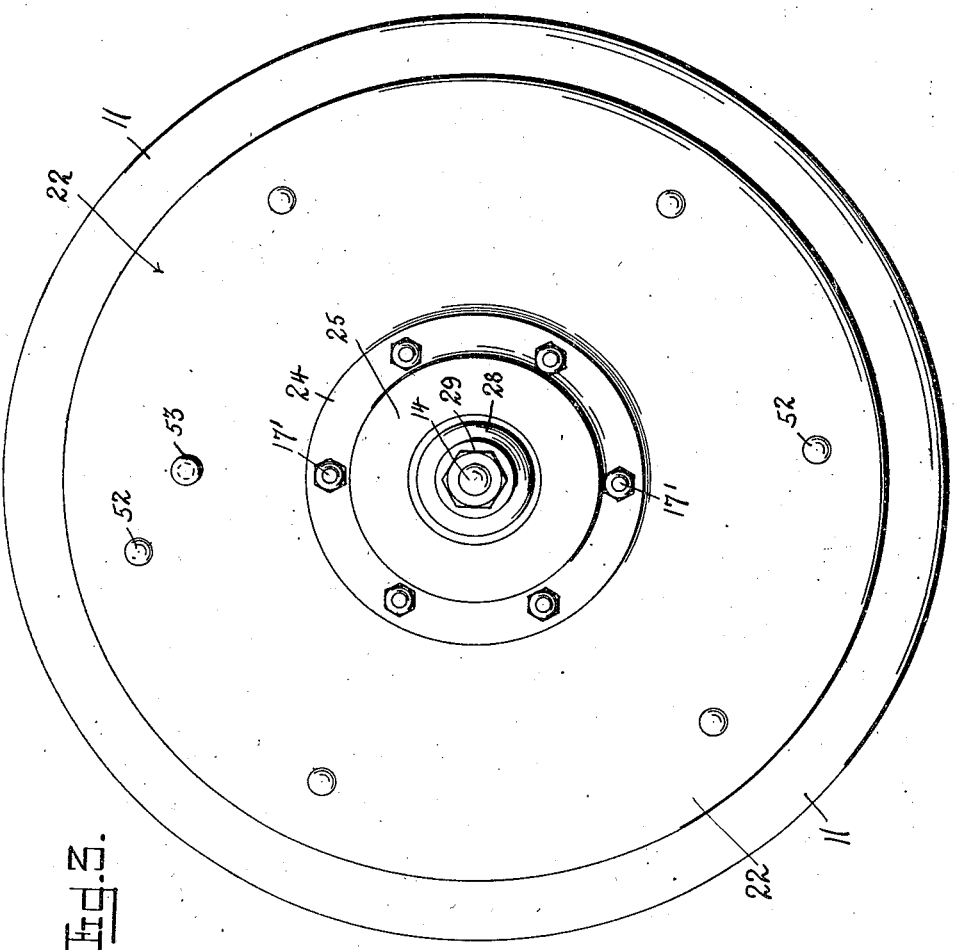

Patented May 15, 1923.

1,455,517

UNITED STATES PATENT OFFICE.

ARNOLD JUCUM ARNOLDSON, OF ELSINORE, UTAH.

RESILIENT WHEEL.

Application filed May 12, 1922. Serial No. 560,414.

*To all whom it may concern:*

Be it known that I, ARNOLD JUCUM ARNOLDSON, a citizen of the United States, residing at Elsinore, in the county of Sevier and State of Utah, have invented certain new and useful Improvements in Resilient Wheels, of which the following is a specification.

This invention relates to vehicle wheels, more particularly to wheels employed on motor driven vehicles, and has for one of its objects to provide a wheel having an improved arrangement of internal springs that yield to either forward or rearward movement of the vehicle, and thus effectually absorb shocks from either direction.

Another object of the invention is to provide a device of this character including a system of internal springs and enclosed in an oil tight chamber within the wheel and in which the springs and other parts are constantly immersed.

With these and other objects in view the invention consists in certain novel features of construction as hereinafter shown and described and then specifically pointed out in the claims, and in the drawings illustrative of the preferred embodiment of the invention:—

Figure 1 is a side elevation from the inner side and with the cover members removed.

Fig. 2 is a section on the line 2—2 of Fig. 1.

Fig. 3 is a side elevation from the outside.

Figs. 4 and 5 are enlarged detached perspective views of a pair of the stop plates.

The improved wheel comprises a rim member 10 of any suitable material and size, and adapted to support a tire of any required construction, either solid or pneumatic, but for the purpose of illustration a solid tire is shown, and indicated conventionally at 11.

Located centrally of the rim 10 is a relatively large flat hub 12 apertured to receive the journal 13 of an axle, a portion of which is shown at 14.

Attached to the side faces of the hub are plates 15 and 16, the plates and the hub being rigidly connected preferably by rivets 17.

Extending from the rim of the plate 15 are projections 18, and extending from the rim of the plate 16 are similar projections 19, the projections of the two plates being thus arranged in pairs. Connected through each pair of the lugs at one of the outer corners is a pintle member 20 and swinging upon each pintle member is a bearing arm 21.

Formed in the side face of the rim 10 opposite to the web 22 are a plurality of sockets or recesses 30, each recess having a counter recess 31 in its outer wall.

Fitting in each alternate recess is a stop plate 32, and likewise, fitting in each of the other alternate recesses is a stop or pulling plate 33.

Each of the stop plates 32 is provided with a stud 34 carrying an anti-friction roller 35 against each of which one of the arms 21 bears, as shown.

The springs 36 are supported at their ends in sockets 37 and 38 bearing respectively against the hub 12 and the arms 21, as shown.

Each of the stop members 32 is provided with a recess 41 in the outer end, and each of the stop members 33 is provided with a like recess 42 in the outer end as shown in Figs. 4 and 5, the recesses to engage the stock portions of cap screws 43, the heads 44 of which bear at one side over the adjacent portion of the stop members and are received in the sockets or recesses 31 in the body of the rim. The cap screws are tapped into the body of the rim 10, and thus serve to firmly hold the members 32 and 33 coupled to the rim.

Any required number of the stop members 32 and 33 may be employed, but six of each are shown for the purpose of illustration.

Supported between each of the bearing arms 21 and the hub 12 are springs 36, the springs engaging in cup devices 37 and 38 on the hub and the arms to prevent displacement of the spring when under strain. Any required number of the springs may be employed, but two are shown for each of the bearing arms, for illustration.

Each stop member 33 is provided at the outer corner farther from the pintle 34 of the roller 35 with a stud 39 carrying anti-friction rollers 40.

Extending inwardly from one side of the rim 10 is a web 22 preferably integral with the rim and apertured to engage over a reduced portion of the hub 12, and bearing upon the web 22 is a reinforcing disk 24, the latter secured to the web 22 by bolts 17, as shown in Fig. 2.

The disk 22 is formed with an annular enlargement 25' to form a seat for a packing ring 26.

The axle 14 is formed with a stop collar 27, and the hub 12 and its attachments are secured to the journals 13 and against the stop collar by a washer 28 and nut 29, as shown.

The pulling lugs 33 are so disposed that they will be engaged by the rollers 40 when the vehicle is drawn forwardly, as hereafter explained.

Bearing against the plate 16 and surrounding one of the reduced ends of the hub 12 is a reinforcing disk 46, and bearing against the face of the rim 10 opposite to the web 22, is an annular cover disk or web 45 the latter also bearing around the reinforcing member 46, the latter is formed with an enlargement 49' to receive a packing ring 50.

Bearing over the inner part of the cover member 45, is another reinforcing disk 48, corresponding to the disk 24, at the opposite side of the wheel. Formed in the face of the rim 10 next to the cover member 45 is an annular seat to receive an annular packing 51.

The bolts 17' extend through the members 22 and 24 and bind them firmly together, while the reinforcing member 48 is secured to the cover member by bolts 17², as shown.

The space defined by the rim 10, hub 12, plates 15, 16, webs 22 and 45, provides a lubricant chamber and to which the lubricant is supplied through an aperture closed by a screw cap 53. The webs 22 and 45 form a side closure for said lubricant chamber.

All of the members within the oil holding space are thus constantly immersed in the oil bath and rotate therein as the wheel revolves, thus constantly lubricating the movable parts.

The members 21 are maintained tangentially of the hub 12, and when a pulling force is applied to the axle, in the direction of the arrow in Fig. 1 the hub 12 and its attachments will be rotated forwardly and cause the members 21 forwardly of the axle to bear against the rollers 35 which are forwardly of the axle, and thus "pick up" the rim 10 and the tire carried thereby and rotate the latter with the hub, the springs 36 yielding to cause the motion of the rim to be gradually produced and preventing jars or concussions. The springs thus serve as effectual "shock absorbers."

In event of abnormal resistance the rollers 40 will engage the stop members 33 and prevent the hub and its attachments from rotating entirely around within the rim.

If the pulling force is reversed, or the vehicle "backed" the rollers 40 will engage the stops 33 and limit the rearward movement, as will be obvious.

The springs 36 will be relatively strong and possess sufficient resistance to hold the hub member and its attachments against normal movement between the parts, but the parts will be prevented from abnormal rotary movement either forwardly or backwardly by the stop members 32 and 33.

The rim member 10 may be of hard wood, but all of the other parts will be of metal. The rim member may also be of metal if required, and of any size and of any strength.

The improved wheel is simple in construction, effective in operation and may be constructed of any required size of capacity, and adapted to be used under vehicles of heavier or lighter type.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. A wheel of the class described comprising an annular rim, a plurality of stop members in spaced relation and extending inwardly from said rim, each alternate stop having a bearing roller, a hub member rotative with an axle, a plurality of bearing bars swinging relative to said hub member and bearing respectively against said bearing rollers, springs supporting said swinging bars in yieldable engagement with said bearing bars, stop rollers carried by said hub member and extending into the paths of the other alternate stop members.

2. A wheel of the class described comprising an annular rim, a plurality of stop members in spaced relation and extending inwardly from said rim, each alternate stop having a bearing roller, a hub member rotative with an axle, and having a reduced outer portion, plates bearing against the opposite sides of said hub extension and each having a plurality of radial projections, a bearing bar swinging from each of said hub plate extensions, and bearing respectively against said bearing bars, springs supporting said swinging bars in yieldable engagement with said bearing bars, stop rollers carried by hub extensions and extending into the paths of the other alternate stop members.

3. A wheel of the class described comprising a hub having an annular extension, plates bearing against opposite sides of said hub and provided with a plurality of radial projections, an annular rim having an integral web at one side movably engaging the hub and one of the hub plates and its radial extensions, an annular reinforcing disk movably engaging the hub and attached to the web, an annular member movably engaging the hub and bearing against the other of said hub plates, an annular cover member attached to the rim at the side opposite to the web, and movably engaging the last mentioned annular members, a plurality of stop members in spaced relation and extending inwardly from said rim, each alternate stop having a bearing roller, a bearing bar swinging from each of said hub plate extensions and respectively engaging said bearing rollers, springs supporting said swinging bars in yieldable engagement with said bearing bars, and a stop roller carried by each of said hub plate extensions and extending into the paths of the other alternate stop members.

In testimony whereof, I affix my signature hereto.

ARNOLD JUCUM ARNOLDSON.